United States Patent [19]
Webster, Jr. et al.

[11] Patent Number: 4,892,385
[45] Date of Patent: Jan. 9, 1990

[54] SHEET-MATERIAL AUTHENTICATED ITEM WITH REFLECTIVE-DIFFRACTIVE AUTHENTICATING DEVICE

[75] Inventors: William M. Webster, Jr., Princeton; John P. Russell, Pennington, both of N.J.

[73] Assignee: General Electric Company, Schenectady, N.Y.

[21] Appl. No.: 235,970

[22] Filed: Feb. 19, 1981

[51] Int. Cl.[4] .......................... G02B 5/18; B44F 1/12
[52] U.S. Cl. ................................ 350/162.23; 283/91; 427/7; 428/916
[58] Field of Search ...................... 283/91, 902; 427/7; 428/915, 916; 350/162.11, 162.17, 162.19, 162.23; 156/277

[56] References Cited

U.S. PATENT DOCUMENTS

| | | | |
|---|---|---|---|
| 3,643,216 | 2/1972 | Greenaway et al. | 340/146.3 P |
| 4,034,211 | 7/1977 | Horst et al. | 350/162 SF X |
| 4,119,361 | 10/1978 | Greenaway | 350/1.1 |
| 4,184,700 | 1/1980 | Greenaway | 283/91 |
| 4,304,809 | 12/1981 | Moraw et al. | |

FOREIGN PATENT DOCUMENTS

| | | | |
|---|---|---|---|
| 0488652 | 5/1976 | Australia | 156/277 |
| 0012375 | 12/1983 | European Pat. Off. | |

Primary Examiner—Bruce Y. Arnold
Attorney, Agent, or Firm—William Squire; James C. Davis, Jr.; Paul R. Webb, II

[57] ABSTRACT

An improved authenticating device comprises a substrate bonded to the sheet material, the substrate having a reflective diffractive structure formed as a relief pattern on a viewable surface thereof, and a transparent material covering the structure. Specified grating parameters of the diffractive structure, obtainable at low cost, result in peculiar, but easily discernable, optical color properties that cannot be copied by color copying machines.

2 Claims, 1 Drawing Sheet

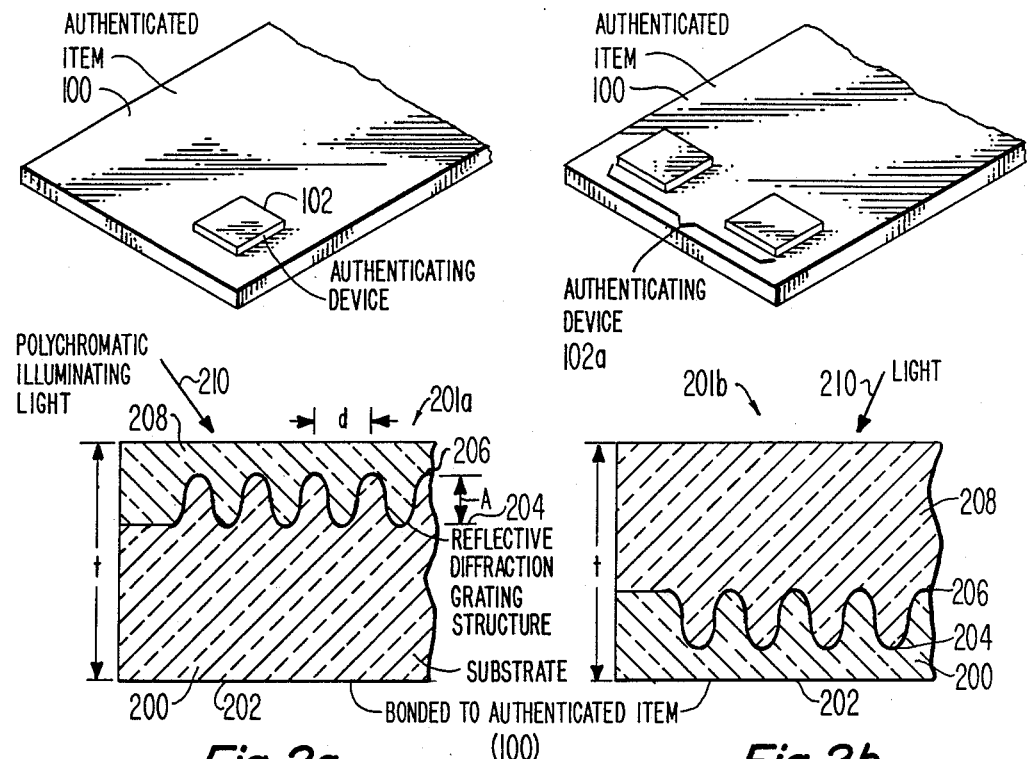

SHEET-MATERIAL AUTHENTICATED ITEM WITH REFLECTIVE-DIFFRACTIVE AUTHENTICATING DEVICE

This invention relates to devices for authenticating various items of sheet materials which are subject to counterfeiting, such as bank notes and other valuable documents, credit cards, passports, security passes, and phonograph records or their covers, for example. The present invention is related to the respective inventions disclosed in U.S. patent applications Ser. No. 256,111 and Ser. No. 255,971 by Gale et al, filed even date herewith and assigned to the same assignee as the present application. Ser. No. 236,111 is now U.S. Pat. No. 4,417,784 and Ser. No. 235,970 is now abandoned.

Recently, there have been great advances in photocopying machines for the color copying of documents. It is believed that these advances will continue. Therefore, in the near future, it is likely that it will be possible to make a color photocopy of a bank note that the man-in-the-street is incapable of (or, at least, will have great difficulty in) distinguishing from the original. More particularly, while it is true that a genuine bank note makes use of authenticating means (such as inks of many colors and intricate engraved designs on special paper which sometimes contain watermarks or embedded colored platelets or metal threads) which currently permit an expert to distinguish a counterfeit from a genuine bank note, the unsophisticated layman is in no position to make use of such authenticating means. Therefore, as color photocopying improves, a real danger exists that the man-in-the-street will lose faith in the genuineness of paper currency. Such a situation could create havoc.

In order to be practical, any authenticating device for solving this problem must, inter alia, meet all four of the following criteria:
1. The authenticating device must produce an effect which is not capable of being reproduced by any type of color copier.
2. The effect produced by the authenticating device must be quickly and readily discernable, under ordinary lighting conditions, without requiring any significant degree of skill on the part of an unsophisticated layman.
3. The sophistication and capital cost of the equipment required to fabricate an authenticating device and to securely attach the authenticating device to an authenticated item (e.g., bank note, etc.) must be high enough to be beyond the reach of would-be counterfeiters.
4. Under high volume conditions, the additional per-unit cost of fabricating an authenticating device and securely attaching it to the authenticated item (including both the amortization of the high capital cost of the equipment, as well as the per-unit variable cost) must be low enough not to constitute an impediment to its use.

Reference is made to U.S. Pat. No. 4,186,943, which issued Feb. 5, 1980, to Lee, and to British Pat. No. 1,394,021, which issued May 14, 1975. Each of these patents is concerned with an authenticating device for items such as bank notes. The authenticating devices disclosed in these patents fulfill the first three of the above criteria, but not the fourth criterion. More specifically, the authenticating devices disclosed in these patents are comprised of a plastic strip or sheet substrate coated with a sufficient number of separate overlaying layers of quarter-wave (at a specified wavelength within the visible spectrum) films of dielectric materials to operate effectly as a transmissive-reflective color filter. Such a color filter, when illuminated by polychromatic (e.g., white) light, selectively reflects most of the light in a certain portion of the visible spectrum and selectively transmits most of the light in the remaining portion of the visible spectrum. Thus, the color of the reflective light and the color of the transmitted light are different from each other. By properly specifying the value of the wavelength of the quarter-wave dielectric films, the respective colors of the reflected and transmitted light may be made substantially complementary (and, therefore, very quickly and readily distinguishable from each other by an unskilled person). Further, the spectral portion (color) of reflected light from such a device which is observed depends on the angle at which it is illuminated and viewed. Therefore, the observed color of this portion changes as the device is tilted in relation to the direction of the illuminating light. This change in observed color with angle also may be used to provide a change between two complementary reflected colors with a change in viewing angle.

While such an authenticating device works well for a bank note or the like, its per-unit cost of fabrication is inherently quite high. The reason for this is that each of the multi-layers of dielectric film is comprised of a different dielectric material having a different index-of-refraction. Each of these layers must be successively and separately laid down (by such means as evaporation or sputtering deposition in a vacuum) with great accuracy to insure that the thickness of each particular dielectric material is equal to one-quarter of the specified wavelength of visible light traveling through that particular dielectric material (i.e., having the index-of-refraction of that particular dielectric material). The cost of such successive and separate laying down is not a one-time capital cost, which can be amortized over a high volume of bank notes, but is part of the per-unit variable cost that applies to each and every authenticating device.

Reference is made to U.S. Pat. Nos. 4,033,059, which issued July 5, 1977, to Hutton et al., and to 4,124,947, which issued Nov. 14, 1978, to Kuhl et al. Each of these patents discloses an authenticating device comprised of an imprint of intaglio pattern elements on a substrate. The intaglio pattern elements are in the form of one or more fields of closely juxtaposed, non-intersecting and non-contacting, lengthwise-extending mounds or peaks. The reflected color of the mounds contrasts in luminance with that of the substrate (i.e., one has a relatively light reflective color and the other has a relatively dark reflective color). However, as long as the authenticating device is viewed from an angle such that both the mounds, themselves, and the intervening substrate spaces between adjacent mounds are within the line of sight of a viewer, the luminance of the observed reflected color is an integration of that of the mound reflected color and the substrate reflected color. The color hue of the integrated observed reflected color turns out to be fairly close to that of the mounds' color, although the saturation of the integrated observed reflected color is substantially different from that of the mounds color. On the other hand, when the mounds are viewed within a band of angular orientations, with respect to the substrate, such that the presence of the mounds occlude the intervening spaces between adjacent mounds, the observed color is solely that of the mounds, themselves, (which contrasts in luminance with the aforesaid integrated color). In the case of Kuhl et al., when the mounds are viewed within such a band, one or more very thin lines, which extend in a direction substantially perpendicular to the lengthwise extending mounds and have the color of the substrate, become observable in contrast to the mound color background. These thin lines are achieved by breaking each lengthwise extending mound into the same given set of two or more slightly spaced longitudinal segments, the corresponding spaces between longitudinal segments of adjacent mounds being aligned with one another. Thereby, the above-mentioned observable thin lines appear when viewed within such a shallow (in a plane perpendicular to the surface of the substrate), extremely narrow (in a plane parallel to the surface of the substrate) band of angular orientations, because the mound segments then occlude the relatively wider spaces of substrate color between adjacent mound segments.

In any case, the band of angular orientations is defined by such factors as the height of the mounds, the size of the intervening spaces between adjacent mounds, the angular orientation of the lengthwise extending mounds with respect to the line of sight of the viewer, the shape of the mounds and the relative location of different angularly-oriented fields of mounds with respect to one another. A "contrast" image (formed by appropriately changing the values of one or more of these parameters for the image with respect to those of the background), which image is incapable of being discerned from the background when viewed at most angular orientations, becomes discernable (by contrast with the background) when viewed from angular orientations within this band.

On a relative basis, the per-unit cost of an intaglio-imprinted indicating device is substantially lower than that of a transmissive-reflective color filter authenticating device, discussed above. However, on an absolute basis, the per-unit cost of an intaglio-imprinted authenticating device is still somewhat too high to satisfy the fourth criterion, set forth above. Furthermore, the intaglio-imprinted authenticating device is much less effective than is the transmissive-reflective color filter authenticating device in meeting the requirements of the second criterion, discussed above. It takes very little skill on the part of an unsophisticated layman to readily and quickly observe a change in complementary colors (each of which is observable over a relatively large but different angular orientation) when a transmissive-reflective color filter authenticating device is observed at different angles or, alternatively, observed, respectively, in reflected or transmitted light. However, in the case of an intaglio-imprinted authenticating device, an image is observed by either a change of contrast in luminance, with respect to that of the background, when the authenticating device is viewed from within a certain prescribed band of angular orientations or, in the case of Kuhl et al., by the appearance of a very thin line of contrasting color when viewed within a certain extremely narrow and also shallow band of angular orientations. In either case, it inherently takes a significant amount of time, as well as some skill, for a viewer to orient properly the intaglio-imprinted authenticating device to reveal the "contrast" image thereon. While this significant amount of time may not be an impediment to the use of an intaglio-imprint authenticating device on such an authenticated item as a stock certificate, which can be observed relatively slowly, it is an impediment to its use on a bank note or the like, which must be observed quickly by an unskilled layman (such as a cashier in a store or in a box office, by way of example).

The present invention is directed to an authenticating device which meets all of the above set forth four criteria. In the present invention, as well as in the inventions disclosed in related patent applications Ser. No. 286,111 and Ser. No. 235,971, an authenticating device comprises a diffractive phase structure embossed or cast on the surface of a substrate, which forms a special type of color filter. In principle, such a filter may be either a transmissive filter or a reflective filter. However, for reasons described in more detail below, a reflective filter is much more practical for use in an authenticating device. An authenticating device incorporating the present invention may make use of the teachings of one or more of U.S. Pat. No. 3,957,354, which issued to Knop on May 18, 1976; U.S. Pat. No. 3,961,836, which issued to Knop on June 8, 1976, and U.S. Pat. No. 4,062,628, which issued to Gale on Dec. 13, 1977.

More specifically, an authenticating device incorporating the present invention includes a substrate bonded to the sheet material of which an authenticated item subject to counterfeiting is comprised. The substrate has a predetermined reflective diffraction grating structure formed as a relief pattern that is situated on at least one region of a viewable surface of the substrate. The reflective diffraction grating structure is filled and covered with a transparent material which exhibits a given index-of-refraction. The relief pattern forming the structure has specified grating profile, physical amplitude, and line frequency parameters, such that the structure operates to separate polychromatic illuminating light incident thereon into at least one pair of adjacent, separate and distinct, reflective beams of contrasting colors, in which the narrowest angular dimension of the beamwidth of each of the beams at a distance of thirty centimeters is at least two milliradians. The transparent material is bonded to the viewable surface of the substrate in a manner sufficiently secure to prevent the transparent material from being removed from the structure without effectively destroying the structure. As used herein, the expression "adjacent, separate and distinct, reflective beams of contrasting colors" is meant to exclude the case of adjacent and contiguous color portions of the continuous spectrum of visible polychromatic (e.g., so-called "white") light, since such adjacent portions are neither "separate and distinct" from each other nor do they have colors which are "contrasting".

In the drawings:

FIG. 1 is a schematic diagram of a first embodiment of an authenticated item having an authenticating device, comprised of single integrated structure, bonded thereto;

FIG. 1a is a schematic diagram of a second embodiment of an authenticated item having an authenticating device, comprised of a plurality of spaced integrated structures, bonded thereto;

FIGS. 2a and 2b schematically illustrate first and second embodiments of an integrated structure of the type employed by the authenticating devices of FIGS. 1 and 1a;

FIGS. 3 and 3a schematically illustrate one species of an authenticating device integrated structure, in which an integrated structure is comprised of a single region diffraction grating structure, and FIGS. 4, 4a, and 4b schematically illustrate other species of an authenticating device integrated structure in which an integrated structure is comprised of a plurality of contiguous different diffraction grating regions.

Referring to FIG. 1, there is shown authenticated item 100 comprised of a sheet material, such as plastic or paper. In describing the present invention, for illustrative purposes, it often will be assumed that authenticated item 100 is a bank note. However, it should be understood that authenticated item 100 may take other forms, such as other types of valuable documents having intrinsic value; credit cards, passports, security passes, or phonograph records or covers therefor, by way of examples. In any case, authenticated item 100 has bonded thereto authenticating device 102. Authenticating device 102 consists of a single integrated structure of the type shown in either FIGS. 2a or 2b. In FIG. 1a, authenticating device 102a consists of two (or more) spaced integrated structures, each of the type shown in either FIGS. 2a or 2b.

As indicated in FIGS. 2a and 2b, integrated structure 201a or 201b, comprising authenticating device 102 or 102a, includes substrate 200 having a bottom surface 202 that is bonded to authenticated item 100 and a top surface 204 having a predetermined reflective diffraction grating structure 206 formed thereon. Transparent material 208 fills and covers reflective diffraction grating structure 206. Further, transparent material 208 exhibits a given index-of-refraction larger than unity. Transparent material 208 is preferably a plastic material, such as polyvinylchloride (PVC) or polycarbonate polyester, by way of example. (The index-of-refraction of such materials is nominally about 1.5). While substrate 200 may be comprised of metal, it is preferably also comprised of a plastic or an adhesive material.

In the case of integrated-structure embodiment 201a, shown in FIG. 2a substrate 200 may be formed from a thermoplastic sheet having diffractive structure 206 embossed or cast on surface 204 thereof. Structure 206 may be made reflective by vacuum (e.g., evaporation or sputtering) deposition of a thin metal (e.g., aluminum) film. Transparent material 208 may then be added by laminating a plastic layer to surface 204 or, alternatively, by applying a coating of a plastic monomer or plastic solution which is thereafter cured into a solid layer. In this case, transparent material 208 and substrate 200 may be made of either the same or different plastics.

In the case of integrated-structure embodiment 201b, shown in FIG. 2b, transparent material 208 comprises the original plastic sheet in which the diffraction grating structure 206 is embossed or cast, and substrate 200 may comprise a laminated plastic layer or either a plastic monomer or plastic solution that is later cured into a thin plastic layer. Alternatively, substrate 200, in the case of integrated-structure 201b, may be comprised of the adhesive material that bonds its bottom surface to authenticated item 100. In other respects, the embodiments of FIGS. 2a and 2b are substantially similar.

In both the embodiments of FIGS. 2a and 2b, the combined thickness of substrate 200 and transparent material 208 is t. As indicated by the arrow, the viewable surface of the reflective diffraction grating structure 206 is illuminated from above, through transparent material 208, by polychromatic light illumination 210. The grating structure 206 reflects the polychromatic illuminating light incident thereon, in manner determined by its physical amplitude A, its lines frequency d and the spatial waveform or shape of its periodic grating profile. In accordance with the principles of the present invention, structure 206 has specified grating profile, physical amplitude A and line frequency d parameters, such that structure 206 is operative to separate polychromatic illuminating light 210 incident thereon into at least one pair of adjacent, separate and distinct, reflected beam of contrasting colors, wherein the size of the narrowest angular dimension of the beam-width of each of the beams at a distance of 30 cm is at least 2 milliradians. Examples of reflective diffraction gratings structures having such specified grating profile, physical amplitude and line frequency parameters are discussed in more detail below in connection with FIGS. 3 and 4.

It is often important that the overall thickness t of the integrated-structure forming authenticating device 102 or 102a be quite small. For instance, in stacking bank notes in a stack of a predetermined number of bills, an angular tilt occurs which has a value dependent upon the product of the thickness t and the number of bills in the stack. In principle, the sheet material could include a declivity or recess having a depth equal to t for receiving the authenticating device. However, this adds to the cost. It is simpler and cheaper to maintain the maximum angular tilt low enough to prevent any bill from slipping off the stack, which is the case when the thickness t is maintained less than 0.0005 mils (i.e., about 12.5 $\mu$m). However, to maintain sufficient strength to prevent tearing of an integrated structure having such a small overall thickness t, the physical amplitude A should be maintained as small as possible. Further, the speed at which a diffractive structure having a relatively small ratio of physical amplitude A to line spacing d can be embossed (by compression molding of a thermoplastic sheet) is much faster (and, therefore, provides a significant reduction in variable unit cost) than is the case when this ratio is large. This is another reason why the physical amplitude A should be made as small as possible.

A diffraction grating, whether reflective or transmissive, formed by a surface relief pattern is a phase grating. The optical effect produced by a phase grating depends on the value of its optical amplitude a, measured in free-space wavelengths $\lambda$, rather than directly on the value of its physical amplitude A. However, the optical amplitude a is proportional to the physical amplitude A, although the constant of proportionality differs significantly between transmissive and reflective gratings. Specifically, for a transmissive grating, the constant of proportionality is $1/(n_1-n)$, where n is the index-of-refraction of transparent material 208 and $n_1$ is the index-of-refraction of a transparent substrate corresponding to substrate 200. Dielectric materials of the type (such as plastic or adhesive) that are practical for fabricating integrated structure 201a or 201b have indices-of-refraction which do not differ much from one to another. Therefore, although the index-of-refraction of such dielectric materials is high relative to unity (e.g., in the vicinity of 1.5), the difference in indices-of-refraction $(n_1-n)$ of any two of such dielectric materials is small relative to unity, resulting in a large constant of proportionality $1/(n_1-n)$ for a transmissive grating. This renders the physical amplitude A of a transmissive grating quite large relative to its optical amplitude a. On the other hand, the constant of proportionality for a reflective grating is $\frac{1}{2}n$, which is much smaller than unity, since n is larger than unity. This renders the physical amplitude A of a reflective grating quite small relative to its optical amplitude a. As discussed above, there are significant benefits to be had by maintaining physical amplitude A relatively small. It is for this reason that reflective diffraction gratings, rather than transmissive diffraction gratings, are employed in the authenticating devices of the present invention.

Further, the fabrication of the integrated structures 201a and 201b, FIGS. 2a and 2b, lend themselves to continuous-flow processing techniques, which reduce substantially the variable unit cost of fabricating such a structure. For example, in the case of the embodiment of FIG. 2a, a plastic sheet from a first plastic roll (constituting substrate 200) is passed, in turn, through embossing rollers (which emboss grating structure 206), through a vacuum deposition chamber (which metalizes surface of substrate 200 with a reflective coating), then through lamination rollers which simultaneously also receive a laminating plastic having a laminating coating thereon from a second plastic roll (which constitutes transparent material 208). The laminate emerging from the lamination rollers passes through an adhesive application chamber, where the adhesive for boding to the authenticating item is applied. In the case of the embodiment shown in FIG. 2b, the entire lamination step may be omitted, since the bonding adhesive itself may constitute substrate 200, while the embossed plastic from the first-mentioned plastic roll constitutes transparent material 208.

Reference is made to FIGS. 3 and 3a, which schematically illustrate a first species of a diffraction grating structure having specified grating profile, physical amplitude and line frequency parameters, such that the structure is operative to separate polychromatic illuminating light incident thereon into at least one pair of adjacent, separate and distinct, reflected beams of contrasting colors, wherein the size of the narrowest angular dimension of the beam-width of each of the beams at a distance of 30 cm is at least 2 milliradians. More particularly, diffraction grating structure 300 comprises a single region having a narrowest dimension W. As shown in FIG. 3a, diffraction grating structure 300 has a rectangular grating profile, a physical amplitude A and a line spacing d (i.e., a line frequency $d^{-1}$). Further, as indicated in FIG. 3a, grating structure 300 has a duty cycle of b/d. Only the top and bottom surfaces of structure 300 are covered by metalized reflective elements 302 and 304, which metalized reflective elements are applied by vacuum deposition. Such vacuum deposition leaves the substantially vertical sides 306 of the rectangular profile of diffraction grating structure 300 substantially free of metal.

It is assumed that diffraction grating structure 300 is embossed in a plastic substrate 200 (as shown in FIG. 2a) and transparent material 208 is also made of plastic (preferably the same plastic as substrate 200), then transparent material 208 can be bonded to the unmetalized portion of viewable surface 204 of substrate 200 in a manner sufficiently secure to prevent removal thereof from diffraction grating structure 300 without effectively destroying structure 300. The same results hold in the case where diffraction grating structure 300 is embossed in a plastic transparent material 208 (as shown in FIG. 2b) and substrate 200 is in the form of either a plastic or an adhesive material.

It should be understood, however, that metalization of only the top and bottom surfaces of a rectangular grating is not the only way to prevent removal of the transparent material without effectively destroying the grating structure. A grating structure having any type of profile may be so thinly metalized such that there are minute voids of metal distributed over the profile. Alternatively, a sufficiently strong metal-plastic bond between transparent material and a totally metalized diffraction grating structure may be used.

Diffractive-subtractive color filters are disclosed in detail in the aforesaid U.S. Pat. No. 3,957,354, which, inter alia, may be comprised of a rectangular profile diffraction grating such as diffraction grating structure 300. More particularly, diffraction grating structure 300 operates to separate polychromatic illuminating light incident thereon into a zero-order reflective beam and one or more higher diffraction order reflective beams. In accordance with the teachings of U.S. Pat. No. 3,957,354, the respective colors of the zero-diffraction order and each of the higher diffraction orders of a rectangular profile diffraction grating depends on the wavelength spectrum characteristics of the polychromatic illuminating light and the optical amplitude a (which, as has been discussed above, is proportional to the physical amplitude A) of the rectangular profile diffraction grating. Furthermore, the resultant color of the sum of all the higher diffraction order beams is the complement of the color of the zero diffraction order.

As is known in the art, the angular separation between any pair of adjacent diffraction orders is a direct function of line frequency (i.e., $d^{-1}$). By making the line frequency sufficiently high, the diffraction angle becomes big enough to separate each pair of adjacent diffraction orders into separate and distinct beams. For fine-line gratings, (i.e., where the line space d has a value less than twice the wavelength of the light), the diffraction angle becomes large enough that only the zero and the first diffraction orders may occur. In this case, the color of the first diffraction order is the complement of the color of the zero diffraction order, so that the respective colors of the zero and first diffraction orders contrast with one another to a great extent. However, even at lower line frequencies, the physical amplitude A may be specified at such a value (in accordance with the teachings of aforesaid U.S. Pat. No. 3,957,354) that the zero and first diffraction order have contrasting colors.

Contrast is enhanced if the respective colors of an adjacent pair of diffraction orders (e.g., the zero and first diffraction orders) are near maximum saturation. In the case of diffraction gratings having line spacing d of at least 5 micrometers (i.e., in those cases where the Huygens-Kirchoff approximation is valid), maximum saturation occurs when the duty cycle b/d is at 50 percent. However, for any fine-line diffractive-subtractive color filter grating, maximum saturation occurs at a ratio of b/d determined by the particular solution of Maxwell's equations (taking into consideration all boundary condition parameters of the grating and the polarization parameters of the incident light). In general, for fine-line rectangular profile diffractive-subtractive color filters, maximum saturation occurs at a value of the ratio b/d which is other than 50 percent and which is different for reflective and transmissive grating structures. By specifying many different sets of boundary conditions, a computer may be used to solve Maxwell's equation by numerical analysis to thereby predict the fine-line reflective rectangular profile grating parameters d, b and A at which maximum saturation of desired complementary color zero and first diffraction order reflected beams will result. Alternatively, if the reflective grating parameters d and A are specified, the value of the ratio b/d that yields a degree of saturation of the color produced thereby which is close to the maximum can be easily determined experimentally by a cut and try method.

In order to meet criterion 2, discussed above, the visual effect on a viewer produced by at least one pair of adjacent (e.g., zero diffraction order and the first diffraction order) reflective beams from diffraction grating structure 300 has to be quickly and readily discernable at a normal viewing distance from authenticated item 100, under ordinary lighting conditions, without requiring any significant degree of skill on part of the viewer. If a normal viewing distance is assumed to be 30 cm (i.e., about 1 foot), the narrowest dimension W of diffraction grating structure 300 should be, at the very least, sufficiently large to subtend an angle of two milliradians (at this normal viewing distance of 30 cm), in order to just meet criterion 2 (discussed above). In other words, disregarding any divergence of either the reflected zero order or higher order beams, the narrowest dimension of the beam-width of each of these beams is proportional to W, and at 30 cm must correspond with an angular dimension, at the very least, of two milliradians. For optimum discernability, the narrowest angular dimension of the beam-width of each of the beams, at a distance of 30 cm, should be at least an order of magnitude larger than this (i.e., 20 milliradians or more).

The expression "under ordinary lighting condition" needs some further explanation. When a diffraction grating is illuminated from a single collimated light source, it produces its most separate and distinct zero and higher diffraction order output beams. However, when it is illuminated by substantially solely diffuse light, it produces its least separate and distinct zero and higher diffraction order output beams. Ordinary lighting conditions, under which an authenticated item is normally viewed, consists of various separate, more or less collimated light sources together with a diffuse light background (with the exact relationship varying from one environment to another). When the narrowest angular dimension of the beam-width of each of the pair of adjacent reflective beams of contrasting colors, at a distance of 30 cm, is at least 2 milliradians the beams are sufficiently separate and distinct, to be discerned, under "ordinary lighting conditions", i.e., an unskilled viewer can readily locate and discern the reflective beams by merely tilting, that is, changing the angular orientation of, an authenticated item with respect to his line of sight.

Referring to FIG. 4, there is shown a species of the present invention in which an integrated structure of an authenticating device is comprised of a plurality of contiguous regions, each region consisting of a different diffraction grating structure. More specifically, as shown in FIG. 4, region 1 diffraction grating structure 400 is in the form of a circle of diameter W and region 2 diffraction grating structure 402 is in the form of a rectangle that surrounds region 1 structure 400 and has a narrowest dimension that is greater than W. A first sub-species of grating structures 400 and 402 is shown in FIG. 4a and a second sub-species of grating structures 400 and 402 is shown in FIG. 4b. In accordance with the sub-species shown in FIG. 4a, both grating structures 400 and 402 have rectangular profiles and form diffractive-subtractive color filters similar to grating structure 300. Grating structure 400 of FIG. 4a has a specified line spacing d and a specified physical amplitude $A_1$, while grating structure 402 of FIG. 4a has the same specified line spacing d and a specified physical amplitude $A_2$ different from $A_1$. Since grating structure 402 is contiguous with grating structure 400, a zero diffraction order of both grating structures 400 and 402 may be simultaneously viewable by a viewer. Further, since the line spacing d is the same for grating structures 400 and 402, a first diffraction order of grating structures 400 and 402 in FIG. 4a also may be simultaneously viewable by a viewer. However, the respective angular orientations of the authenticated item with respect to the light of sight of the viewer are different for simultaneously viewing the respective first diffraction orders from what they are for simultaneously viewing the respective zero diffraction orders.

Referring now to the sub-species of FIG. 4 shown in FIG. 4b, both grating structure 400 of region 1 and grating structure 402 of region 2 in FIG. 4b have sinusoidal grating profiles and have the same physical amplitude A. However, the line spacing $d_1$ of grating structure 400 of FIG. 4b is different from the line spacing $d_2$ of grating structure 402 of FIG. 4b. As is known in the art, the arcsin of the diffraction angle of a diffraction grating is equal to the ratio of wavelength to line spacing. Therefore, each of grating structures 400 and 402 of FIG. 4b, in response to being illuminated by polychromatic light, will produce higher diffraction orders in which the polychromatic light is angularly dispersed into its component spectral colors. However, because the line spacings $d_1$ and $d_2$ of grating structures 400 and 402 of FIG. 4b are different from one another, different selected spectral colors may be derived at the same given angle of the first diffraction order for respective regions 1 and 2 (in the sub-species of FIG. 4b) by properly choosing the respective values of line spacings $d_1$ and $d_2$. By way of example, if line spacing $d_1$ of grating structure 400 of FIG. 4b is selected to be only 82% of line spacing $d_2$ of grating structure 402 of FIG. 4b, then grating structure 400 will produce a reflected beam of green (530 nm spectral wavelength) light and grating structure 402 will produce a reflected beam of complementary red (650 nm spectral wavelengths) light at the same given diffraction angle of the first diffraction order. Therefore, a viewer viewing regions 1 and 2 at this given diffraction angle will see simultaneously a green region 1 and a red region 2. Furthermore, when viewing regions 1 and 2 of FIG. 4 at slightly different angles, the respective colors of regions 1 and 2 will no longer be green and red, respectively, but still will have essentially contrasting colors within the entire spatial intersection of the respective dispersion spectrums of grating structures 400 and 402 of FIG. 4b, due to the difference in the respective values of $d_1$ and $d_2$ thereof.

It is desirable that the reflected beams from regions 1 and 2 in the sub-species of FIG. 4b be as bright as possible. Therefore, the physical amplitude A of grating structures 400 and 402 in FIG. 4b preferably has a value which minimizes the amount of light which remains in its respective zero diffraction order, which results in the light diffracted into the higher diffraction order reflected beams being maximized. Furthermore, to maximize the amount of light diffracted into each first diffraction order beam, it is desirable that both grating structures 400 and 402 of FIG. 4b be fine-line diffraction gratings (discussed above), thereby suppressing the occurrence of higher diffraction order beams above the first diffraction order. In regard to maximizing the brightness of the first diffraction order of grating structures 400 and 402 of FIG. 4b, reference should be made to the teachings of aforesaid U.S. Pat. Nos. 3,961,836 and 4,062,628. The sub-species shown in FIG. 4b, per se, forms part of the invention disclosed in the aforesaid related patent application Ser. No. 235,971.

Returning to FIGS. 2a and 2b, transparent material 208 may be colorless or, alternatively, may include a dye operating as an absorbent subtractive color filter that is positioned in series with the reflective beams from the diffraction grating structure 206. Specifically, the dye should have spectral wavelength dependent transmission characteristics that enhance the color selectivity of the reflected beams from diffraction grating structure 206. In addition, the presence of a dye within transparent material 208 enhances signal-to-noise ratio by reducing the glare produced by specular reflection from the metalized diffraction grating structure 206.

Further, transparent material 208 and/or other components of the authenticating device are of a type which lend themselves to being doped with trace chemicals (e.g., magnetic, radioactive, etc.) that permit a more sophisticated analysis by an expert.

What is claimed is:

1. An article comprising an authenticated item of sheet material which is subject to counterfeiting and an authenticating device bonded to said item, wherein said device includes:
   a substrate bonded to said sheet material, said substrate having a predetermined reflective diffraction grating structure formed as a relief pattern that is situated on at least one region of a viewable surface of said substrate,
   a transparent material filling and covering said reflective diffraction grating structure, said transparent material exhibiting a given index-of-refraction greater than unity,
   wherein said relief pattern forming said structure has a rectangular grating profile, physical amplitude and line frequency parameters such that said structure is operative to separate polychromatic illuminating light incident thereon into at least one pair of adjacent, separate and distinct, reflected beams of contrasting colors, wherein the size of the narrowest angular dimension of the beam-width of each of said beams at a distance of thirty centimeters is at least two milliradians, said physical amplitude and line frequency parameters being such that, in cooperation with said given index-of refraction, said structure diffracts through at least a certain angle, determined by said line frequency, a portion of said polychromatic illuminating light to discriminatingly transfer, as a predetermined function of wavelength of the wavelength spectrum of said polychromatic light, some certain fraction of each spectral component of said polychromatic illuminating light into orders higher than the zero diffraction order and transfer substantially the entire remainder of said polychromatic illuminating light into the zero diffraction order, said certain angle being sufficient to obtain zero and higher diffraction order reflected beams that are separate and distinct from one another, whereby the color of said zero diffraction order reflected beam is the complement of the color of the aggregate of all the diffraction order beams higher than said zero diffraction order, and
   wherein said transparent material is bonded to said viewable surface of said substrate in a manner sufficiently secure to prevent said transparent material from being removed from said structure without effectively destroying said structure.

2. The article defined in claim 1, wherein said diffraction grating structure is comprised of a fine-line grating which diffracts said polychromatic illuminating light through a certain angle that is large enough to limit the number of higher diffraction orders to solely said first diffraction order, whereby the color of said zero diffraction order reflected beam is the complement of the color of said first diffraction order reflected beam.

* * * * *